US009876365B2

(12) United States Patent
Mazaki et al.

(10) Patent No.: US 9,876,365 B2
(45) Date of Patent: Jan. 23, 2018

(54) CONTACTLESS POWER SUPPLY CONTROLLER AND CONTACTLESS POWER SUPPLY SYSTEM

(71) Applicant: DENSO CORPORATION, Kariya, Aichi-pref. (JP)

(72) Inventors: Kouji Mazaki, Kariya (JP); Nobuhisa Yamaguchi, Nagoya (JP); Keisuke Tani, Anjo (JP); Eisuke Takahashi, Nagoya (JP); Kazuyoshi Obayashi, Chita-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 360 days.

(21) Appl. No.: 14/766,676

(22) PCT Filed: Feb. 4, 2014

(86) PCT No.: PCT/JP2014/000564
§ 371 (c)(1),
(2) Date: Aug. 7, 2015

(87) PCT Pub. No.: WO2014/122918
PCT Pub. Date: Aug. 14, 2014

(65) Prior Publication Data
US 2015/0380948 A1    Dec. 31, 2015

(30) Foreign Application Priority Data

Feb. 8, 2013  (JP) .................................. 2013-023146

(51) Int. Cl.
*H02J 5/00*   (2016.01)
*H02M 7/217*  (2006.01)
(Continued)

(52) U.S. Cl.
CPC ............. *H02J 5/005* (2013.01); *H02M 7/217* (2013.01); *H02M 3/158* (2013.01); *H02M 3/3353* (2013.01); *H02M 2001/007* (2013.01)

(58) Field of Classification Search
None
See application file for complete search history.

(56) References Cited

U.S. PATENT DOCUMENTS

2009/0096413 A1* 4/2009 Partovi ................... H01F 5/003
                                                              320/108
2013/0119774 A1* 5/2013 Ichikawa .............. B60L 11/123
                                                              307/104

FOREIGN PATENT DOCUMENTS

JP   2009148493 A   7/2009
JP   2011045195 A   3/2011

OTHER PUBLICATIONS

STIC Search Report; dated Sep. 2017.*
(Continued)

*Primary Examiner* — Jared Fureman
*Assistant Examiner* — James Evans
(74) *Attorney, Agent, or Firm* — Harness, Dickey & Pierce, P.L.C.

(57) ABSTRACT

A contactless power supply system for transferring power without contact between a primary side coil and a secondary side coil is provided. In the contactless power supply system, a manipulation unit manipulates a secondary side converter so that power outputted to a load is controlled to be a command value. The manipulation unit manipulates an input voltage of a primary side resonance circuit so that a current flowing in the primary side resonance circuit equals a product of a current flowing in the secondary side resonance circuit and a current coefficient. The current coefficient is defined as a square root of a specific value and the specific value is an equivalent resistance of the secondary (Continued)

side resonance circuit divided by an equivalent resistance of the primary side resonance circuit.

12 Claims, 7 Drawing Sheets

(51) Int. Cl.
*H02M 3/158* (2006.01)
*H02M 3/335* (2006.01)
*H02M 1/00* (2006.01)

(56) References Cited

OTHER PUBLICATIONS

International Search Report and Written Opinion (in Japanese with English Translation) for PCT/JP2014/000564, dated Apr. 28, 2014; ISA/JP.

\* cited by examiner

CONTACTLESS POWER SUPPLY CONTROLLER AND CONTACTLESS POWER SUPPLY SYSTEM

CROSS-REFERENCE TO RELATED APPLICATIONS

This application is a U.S. National Phase Application under 35 U.S.C. 371 of International Application No. PCT/JP2014/000564 filed on Feb. 4, 2014 and published in Japanese as WO 2014/122918 A1 on Aug. 14, 2014. This application is based on and claims the benefit of priority from Japanese Patent Application No. 2013-023146 filed on Feb. 8, 2013. The entire disclosures of all of the above applications are incorporated herein by reference.

TECHNICAL FIELD

The present disclosure relates to a contactless power supply controller applied to a contactless power supply system for transferring power without contact between a primary side coil and a secondary side coil and relates to the contactless power supply system.

BACKGROUND ART

As this type of controller, there is known a controller applied to a contactless power supply system including a primary side coil provided in a power supply station and constituting a primary side resonance circuit and a secondary side coil provided in a vehicle and constituting a secondary side resonance circuit, as seen in the following patent literature 1. This controller is provided to suppress the deviation of a charging voltage of a battery connected to the output side of the secondary side resonance circuit from a target voltage. The deviation is due to a change in the gap between the primary side coil and the secondary side coil.

More specifically, prior to the start of charging of the battery, the battery is electrically disconnected from the output side of the secondary side resonance circuit, and a resistor is connected in parallel to the output side of the secondary side resonance circuit. Then, an output voltage of a high frequency power source for applying an AC voltage to the primary side resonance circuit is set to a measuring voltage, and an output current of the high frequency power source in this case is measured. Since the resistance of the resistor is known, a proper output voltage of the high frequency power source for setting the charging voltage of the battery to the target voltage can be calculated based on the measuring voltage and the output current. Because of this, the deviation of the charging voltage of the battery and the target voltage due to a change in the gap between the primary side coil and the secondary side coil is suppressed, and a decrease in the power transmission efficiency between the coils is suppressed.

CITATION LIST

Patent Literature

PTL 1: JP2011-45195A

SUMMARY OF INVENTION

According to studies by the inventors of the present application, after the calculation of the proper output voltage of the high frequency power source for setting the charging voltage of the battery to the target voltage, the gap between the primary side coil and the secondary side coil can change when a user unloads goods from the vehicle during a time from the start of charging of the battery to the completion. Further, depending on a vehicle stopping or parking position, the relative position between the primary side coil and the secondary side coil can deviate from a position capable of maintaining the high power transmission efficiency between the coils. In these cases, the power transmission efficiency between the coils might decrease.

The present disclosure has been made in view of the forgoing, and it is an object of the present disclosure to provide a contactless power supply controller and a contactless power supply system that can suitably enhance the power transmission efficiency between a primary side coil and a secondary side coil in a situation where power is transferred without contact between the primary side coil and the secondary side coil.

A contactless power supply controller according to an example of the present disclosure is applied to a contactless power supply system that transfers power without contact between a primary side coil and a secondary side coil. The primary side coil and a primary side capacitor constitute a primary side resonance circuit. The secondary side coil and a secondary side capacitor constitute a secondary side resonance circuit. The contactless power supply system includes an AC voltage application unit that applies an AC voltage to the primary side resonance circuit, a secondary side rectifier circuit that converts an AC voltage outputted from the secondary side resonance circuit into a DC voltage, and a secondary side converter that converts the DC voltage outputted from the secondary side rectifier circuit into a predetermined DC voltage and outputs the predetermined DC voltage to a load. The contactless power supply controller includes a manipulation unit. The manipulation unit manipulates the secondary side converter so that control power outputted to the load is controlled to be a command value. The manipulation unit manipulates an input voltage of the primary side resonance circuit so that a current flowing in the primary side resonance circuit equals a product of a current flowing in the secondary side resonance circuit and a current coefficient. The current coefficient is defined as a square root of a specific value and the specific value is an equivalent resistance of the secondary side resonance circuit divided by an equivalent resistance of the primary side resonance circuit.

The inventors of the present application have found that a loss in the primary side resonance circuit and the secondary side resonance circuit in the case where power is transferred without contact between the primary side coil and the secondary side coil can be theoretically minimized by manipulating the input voltage of the primary side resonance circuit so that the current flowing in the primary side resonance circuit equals the product of the current flowing in the secondary side resonance circuit and the current coefficient. In view of this point, the contactless power supply controller includes the manipulation unit. Thereby, it is possible to suitably enhance the power transmission efficiency between the primary side coil and the secondary side coil in the case where power is transferred without contact between the primary side coil and the secondary side coil.

A contactless power supply system according to an example of the present disclosure is a contactless power supply system that transfers power without contact between a primary side coil and a secondary side coil. The contactless power supply system includes a primary side resonance circuit including the primary side coil and a primary side capacitor, a secondary side resonance circuit including the secondary side coil and a secondary side capacitor, an AC voltage application unit that applies an AC voltage to the primary side resonance circuit, a secondary side rectifier circuit that converts an AC voltage outputted from the secondary side resonance circuit into a DC voltage, a secondary side converter that converts the DC voltage outputted from the secondary side rectifier circuit into a predetermined DC voltage and outputs the predetermined DC voltage to a load, and a manipulation unit that manipulates the secondary side converter to control power outputted to the load to a command value and manipulates an input voltage of the primary side resonance circuit so that a current flowing in the primary side resonance circuit equals a product of a current flowing in the secondary side resonance circuit and a current coefficient. The current coefficient is defined as a square root of a specific value and the specific value is an equivalent resistance of the secondary side resonance circuit divided by an equivalent resistance of the primary side resonance circuit.

The contactless power supply system can provide the same advantageous effects as the contactless power supply controller.

BRIEF DESCRIPTION OF DRAWINGS

The above and other objects, features, and advantages of the present disclosure will become more apparent from the following detailed description made with reference to the accompanying drawings, in which.

DESCRIPTION OF EMBODIMENTS

First Embodiment

Hereinafter, a first embodiment will be described with reference to drawings. In the first embodiment, a contactless power supply controller according to the present disclosure is applied to a contactless power supply system of a vehicle (plug-in hybrid car, electric car) including a rotary machine as an in-vehicle main engine.

Figure 1:
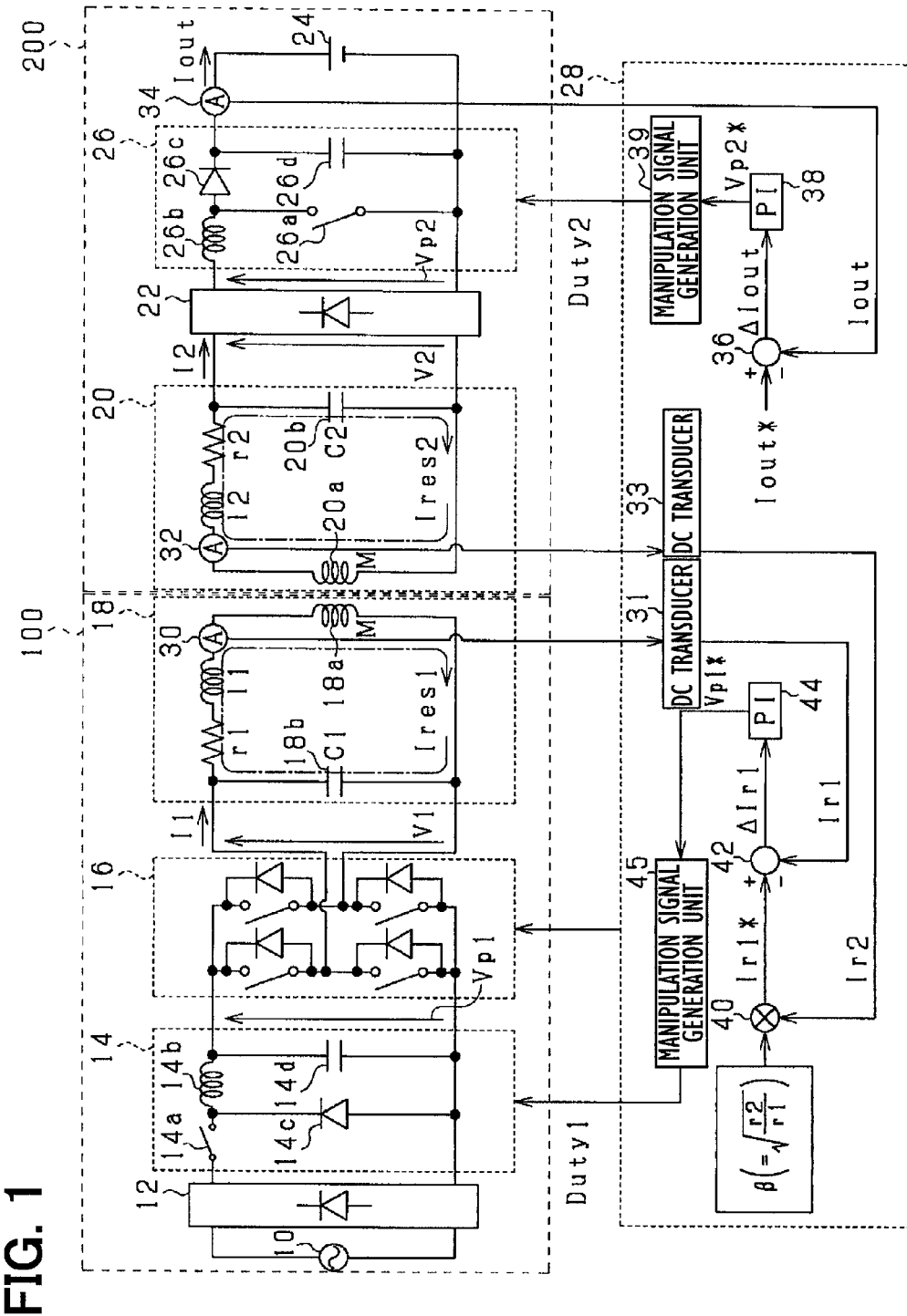
FIG. 1 is a block diagram of a contactless power supply system according to a first embodiment.

As shown in FIG. 1, the contactless power supply system includes a power transmission system 100 provided outside the vehicle (on the ground side) and a power reception system 200 provided in the vehicle.

The power transmission system 100 includes a primary side rectifier circuit 12 for converting an AC voltage of an AC power source 10 (system power source) into a DC voltage, a primary side converter 14 for converting the DC voltage outputted from the primary side rectifier circuit 12 into a predetermined DC voltage and outputting it, a full-bridge inverter 16 for converting the DC voltage outputted from the primary side converter 14 into an AC voltage having a predetermined high frequency (several kHz to a dozen MHz), and a primary side resonance circuit 18 to which the AC voltage outputted from the full-bridge inverter 16 is applied. In this embodiment, a full-wave rectifier circuit composed of diodes is used as the primary side rectifier circuit 12. Further, in this embodiment, the AC power source 10 and the primary side rectifier circuit 12 constitute a "DC power source", and the full-bridge inverter 16 constitutes an "AC voltage application unit (AC voltage application means)".

The primary side converter 14 includes a first switching element 14a, a first inductor 14b, a first diode 14c, and a first smoothing capacitor 14d, and is a step-down converter for stepping down an input voltage and outputting the stepped-down voltage. Further, the primary side resonance circuit 18 is an LC parallel resonance circuit composed of a primary side coil 18a wound around a primary side core and a primary side capacitor 18b connected in parallel thereto. The primary side resonance circuit 18 is a circuit for transmitting power to a secondary side resonance circuit 20 included in the power reception system 200 by electromagnetic induction.

On the other hand, the power reception system 200 includes the secondary side resonance circuit 20 into a DC voltage, a secondary side rectifier circuit 22 for converting an AC voltage outputted from the secondary side resonance circuit 20 into a DC voltage, and a secondary side converter 26 for converting the DC voltage outputted from the secondary side rectifier circuit 22 into a predetermined DC voltage and outputting it to a battery 24 as a load. In this embodiment, a full-wave rectifier circuit composed of diodes is used as the secondary side rectifier circuit 22.

The secondary side converter 26 includes a second switching element 26a, a second inductor 26b, a second diode 26c, and a second smoothing capacitor 26d, and is a step-up converter for stepping up an input voltage and outputting the stepped-up voltage. Further, the secondary side resonance circuit 20 is a circuit provided under the vehicle (outside a floor), and is an LC parallel resonance circuit composed of a secondary side coil 20a wound around a secondary side core and a secondary side capacitor 20b connected in parallel thereto. Further, the battery 24 is the source of power supply to a rotary machine (motor generator) (not shown) as an in-vehicle main engine, and the terminal voltage thereof is, for example, 100 volts or more. As the battery 24, specifically, for example, a nickel hydrogen secondary battery or a lithium-ion secondary battery can be adopted.

A controller 28 performs the process of charging the vehicle by transferring power without contact between the primary side coil 18a and the secondary side coil 20a. The controller 28 captures, through a primary side DC transducer 31, a detection value of a primary side current sensor 30 for detecting a current (hereinafter referred to as a primary side resonance current) flowing in the primary side resonance circuit 18, and captures, through a secondary side DC transducer 33, a detection value of a secondary side current sensor 32 for detecting a current (hereinafter referred to as a secondary side resonance current) flowing in the secondary side resonance circuit 20. Further, the controller 28 captures a detection value of an output side current sensor 34 for detecting an output current of the secondary side converter 26. The controller 28 turns on and off the first switching element 14a included in the primary side converter 14, switching elements included in the full-bridge inverter 16, and the second switching element 26a included in the secondary side converter 26 to perform the charging process based on the detection values of these sensors.

Figure 2:
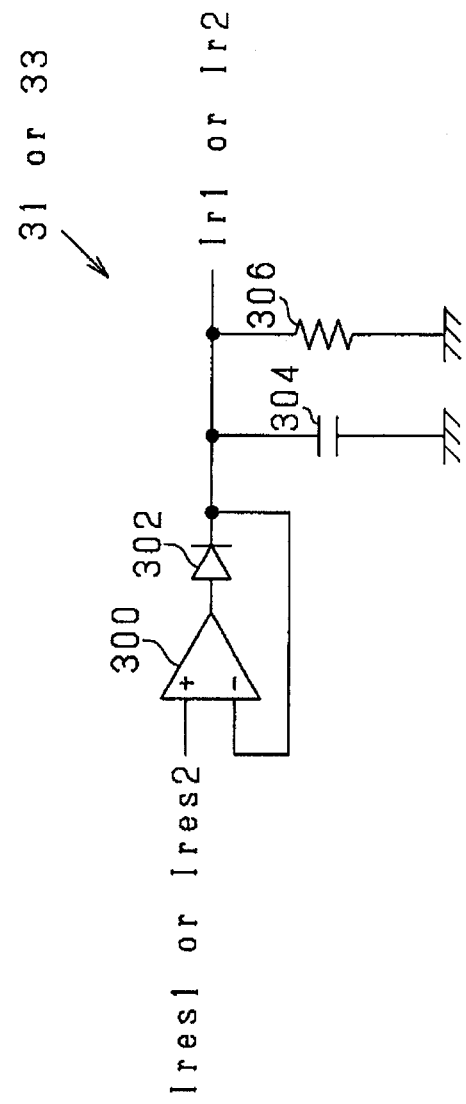
FIG. 2 is a block diagram of a DC transducer according to the first embodiment.

In this embodiment, the primary side DC transducer 31 and the secondary side DC transducer 33 each are a peak value detection circuit for outputting the peak value of an input AC signal, as shown in FIG. 2. Specifically, this circuit is composed of an operational amplifier 300, a diode 302, a capacitor 304, and a resistor 306. More specifically, the detection value of the primary side current sensor 30 (secondary side current sensor 32) is inputted to the non-inverting input terminal of the operational amplifier 300. The output terminal of the operational amplifier 300 is connected to the anode of the diode 302, and the cathode of the diode 302 is connected to the inverting input terminal of the operational amplifier 300. Further, the cathode of the diode 302 is connected to one terminal of the capacitor 304 and the resistor 306, and the other terminal of the capacitor 304 and the resistor 306 is grounded.

In this embodiment, the resonance frequency of the primary side resonance circuit 18 and the resonance frequency of the secondary side resonance circuit 20 are set to the same value. Further, the full-bridge inverter 16 is manipulated so that the frequency of the output voltage of the full-bridge inverter 16 equals the resonance frequency of the primary side resonance circuit 18. In this embodiment, the controller 28 constitutes a "manipulation unit (manipulation means)".

Referring back to FIG. 1, with the above configuration, contactless power supply is performed in a state where the primary side coil 18a and the secondary side coil 20a are opposed to each other during vehicle stopping or parking. More specifically, when the AC voltage is applied to the primary side resonance circuit 18 by the full-bridge inverter 16 and a high frequency current flows through the primary side coil 18a, a magnetic field is generated within the primary side coil 18a, which causes an induced current to flow through the secondary side coil 20a. Thereby, a magnetic field is also generated within the secondary side coil 20a, which forms a main magnetic flux circulating between the primary side core and the secondary side core. Thereby, power is transferred without contact between the primary side coil 18a and the secondary side coil 20a.

Next, the charging process performed by the controller 28 will be further described. FIG. 1 shows a block diagram of the charging process.

First, in the charging process, a process associated with the power reception system 200 will be described. In this embodiment, description will be made on a case where the battery 24 is charged by constant current control.

A charging current deviation calculation unit 36 subtracts the output current (hereinafter referred to as a charging current Iout) of the secondary side converter 26 detected by the output side current sensor 34 from a command value (hereinafter referred to as a command current Iout*) of the charging current outputted to the battery 24, thereby calculating a charging current deviation ΔIout which is a deviation between the command current Iout* and the charging current Iout.

A secondary side feedback manipulation amount calculation unit 38 calculates a command value Vp2* of the input voltage of the secondary side converter 26 required to control the charging current Iout to the command current Iout*, as a manipulation amount for feedback-controlling the charging current Iout to the command current Iout*. More specifically, the secondary side feedback manipulation amount calculation unit 38 calculates the command value Vp2* of the input voltage by proportional-integral control based on the charging current deviation ΔIout.

A secondary side manipulation signal generation unit 39 calculates a secondary side duty ratio Duty2 required to control the charging current Iout to the command current Iout*, based on the command value Vp2* of the input voltage. The secondary side duty ratio Duty2 is a command value of the duty ratio of the second switching element 26a included in the secondary side converter 26, where the duty ratio is the ratio of the on time of the switching element to one period of on/off of the switching element. The secondary side duty ratio Duty2 can be calculated, for example, using a map associating the command value Vp2* of the input voltage with the secondary side duty ratio Duty2.

According to the above-described process, the second switching element 26a is turned on and off based on the secondary side duty ratio Duty2, so that the charging current Iout is feedback-controlled to the command current Iout*.

Next, in the charging process, a resonance current compensation process will be described.

This process is a process for reducing a loss in the primary side resonance circuit 18 and the secondary side resonance circuit 20 during contactless power supply. That is, during a time from the start of charging of the battery 24 to the completion, the gap between the primary side coil 18a and the secondary side coil 20a can change. This can occur, for example, due to a change in the positional relationship between the primary side coil 18a and the secondary side coil 20a when a user gets in and out of the vehicle so that the vehicle body vibrates, or unloads goods from the vehicle so that the loading state of goods changes, during the charging of the battery 24. Further, depending on a vehicle stopping or parking position, the relative position between the primary side coil 18a and the secondary side coil 20a can deviate from a position capable of maintaining the high power transmission efficiency between the coils 18a and 20a. When the gap changes or the relative position deviates, the coupling coefficient between the primary side coil 18a and the secondary side coil 20a changes, so that the primary side resonance current and the secondary side resonance current deviate from a proper value, which might decrease the power transmission efficiency between the coils 18a and 20a.

To address such problems, the resonance current compensation process is performed. In this embodiment, the above process is performed by calculating a command value (hereinafter referred to as a primary side duty ratio Duty1) of the duty ratio of the first switching element 14a, on the condition that a primary side loss which occurs in the primary side resonance circuit 18 in association with the flow of the primary side resonance current Ires1 and a secondary side loss which occurs in the secondary side resonance circuit 20 in association with the flow of the secondary side resonance current Ires2 theoretically become the minimum. Hereinafter, the relationship between the primary side resonance current Ires1 and the secondary side resonance current Ires2 for minimizing the loss will be described, and then the resonance current compensation process will be detailed.

By applying Kirchhoff's second law to the respective current paths of the input side of the primary side resonance circuit 18, the primary side resonance circuit 18, the secondary side resonance circuit 20, and the output side of the secondary side resonance circuit 20, the following equations (eq1) to (eq4) are obtained.

$$V1 = \frac{1}{j\omega C1}(I1 - Ires1) \quad \text{(eq 1)}$$

(eq 2)

$$\frac{1}{j\omega C1}(Ires1 - I1) + (j\omega l1 + r1)Ires1 + j\omega M(Ires1 - Ires2) = 0 \quad \text{(eq 2)}$$

(eq 3)

$$\frac{1}{j\omega C2}(Ires2 - I2) + (j\omega l2 + r2)Ires2 + j\omega M(Ires2 - Ires1) = 0 \quad \text{(eq 3)}$$

(eq 4)

$$V2 = -\frac{1}{j\omega C2}(I2 - Ires2) \quad \text{(eq 4)}$$

In the equations (eq1) to (eq4), "V1" denotes the input voltage of the primary side resonance circuit 18, "I1" denotes the input current of the primary side resonance circuit 18, "r1" denotes the equivalent series resistance of the primary side resonance circuit 18, "C1" denotes the capacitance of the primary side capacitor 18b, and "l1" denotes the leakage inductance of the primary side coil 18a. Further, "M" denotes the mutual inductance between the primary side coil 18a and the secondary side coil 20a, "r2" denotes the equivalent series resistance of the secondary side resonance circuit 20, "C2" denotes the capacitance of the secondary side capacitor 20b, "I2" denotes the output current of the secondary side resonance circuit 20, and "V2" denotes the output voltage of the secondary side resonance circuit 20. Further, "j" denotes an imaginary number, and "ω" denotes the frequency of the input voltage of the primary side resonance circuit 18.

On the other hand, a total loss W which is the sum of the primary side loss W1 and the secondary side loss W2 is expressed by the following equation (eq5).

(eq5)

$$W = W1 + W2 = r1 Ires1^2 + r2 Ires2^2 \quad \text{(eq5)}$$

In the equation (eq5), the total loss W becomes the minimum if the primary side loss W1 equals the secondary side loss W2; therefore, the relationship between the primary side resonance current Ires1 and the secondary side resonance current Ires2 in the case where the total loss W is the minimum is derived as the following equation (eq6).

(eq 6)

$$Ires1 = \beta Ires2 \left( \text{where } \beta = \sqrt{\frac{r2}{r1}} \right) \quad \text{(eq 6)}$$

In the equation (eq6), the square root of a value obtained by dividing the equivalent series resistance r1 of the secondary side resonance circuit 20 by the equivalent series resistance r1 of the primary side resonance circuit 18 is defined as a current coefficient β.

Next, the resonance current compensation process using the current coefficient β will be described.

A primary side command current calculation unit 40 multiplies the output value Ir2 of the secondary side DC transducer 33 (the peak value of the secondary side resonance current Ires2 detected by the secondary side current sensor 32) by the current coefficient β, thereby calculating a command value (hereinafter referred to as a primary side command current Ir1*) of the peak value of the primary side resonance current Ires1.

A primary side current deviation calculation unit 42 subtracts the output value Ir1 of the primary side DC transducer 31 (the peak value of the primary side resonance current Ires1 detected by the primary side current sensor 30) from the primary side command current Ir1*, thereby calculating a primary side current deviation ΔIr1.

A primary side feedback manipulation amount calculation unit 44 calculates a command value Vp1* of the output voltage of the primary side converter 14 required to control the output value Ir1 of the primary side DC transducer 31 to the primary side command current Ir1*, as a manipulation amount for feedback-controlling the output value Ir1 of the primary side DC transducer 31 to the primary side command current Ir1*. More specifically, the primary side feedback manipulation amount calculation unit 44 calculates the command value Vp1* of the output voltage by proportional-integral control based on the primary side current deviation ΔIr1.

A primary side manipulation signal generation unit 45 calculates a primary side duty ratio Duty1 required to control the output value Ir1 of the primary side DC transducer 31 to the primary side command current Ir1*, based on the command value Vp1* of the output voltage. The primary side duty ratio Duty1 can be calculated, for example, using a map associating the command value Vp1* of the output voltage with the primary side duty ratio Duty1.

According to the resonance current compensation process described above, in a situation where constant current control is performed by manipulation of the input voltage Vp2 of the secondary side converter 26, the first switching element 14a is turned on and off based on the primary side duty ratio Duty1, so that the output voltage Vp1 of the primary side converter 14 is manipulated each time. Thereby, the peak value of the primary side resonance current Ires1 is controlled to the primary side command current Ir1*.

In this embodiment, the block diagram regarding the process of controlling the charging current Iout to the command current Iout* and the resonance current compensation process is shown in the single controller 28. However, this does not mean that these processes can be executed only by the single controller. More specifically, for example, these processes can also be executed in the case where controllers are provided in the power transmission system 100 and the power reception system 200 respectively and cooperate with each other while exchanging information between the controllers.

According to this embodiment detailed above, the following advantageous effects are obtained.

(1) During the charging of the battery 24, there is performed the resonance current compensation process for manipulating the output voltage Vp1 of the primary side converter 14 each time so that the peak value of the primary side resonance current Ires1 equals the product of the peak value of the secondary side resonance current Ires2 and the current coefficient β. According to this process, even if the coupling coefficient between the primary side coil 18a and the secondary side coil 20a changes or the command current Iout* changes during the charging of the battery 24, it is possible to suitably reduce the total loss W. Thereby, it is possible to suitably enhance the power transmission efficiency between the primary side coil 18a and the secondary side coil 20a.

(2) The step-down converter is used as the primary side converter 14, and the step-up converter is used as the secondary side converter 26. The secondary side resonance circuit 20 and the secondary side rectifier circuit 22 function as a constant-current power source during contactless power supply. If a configuration in which the step-up converter is used as the primary side converter 14 and the step-down converter is used as the secondary side converter 26 is adopted, the output side of the secondary side rectifier circuit 22 is disconnected from the battery 24 while the switching element included in the step-down converter is turned off. Thereby, the voltage between the terminals of the switching element included in the step-down converter rises excessively by the supply of a constant current to the input side of the secondary side converter 26, which might decrease the reliability of the secondary side converter 26. On the other hand, according to this embodiment, the above problem does not occur, so that it is possible to avoid a decrease in the reliability of the secondary side converter 26.

Second Embodiment

Hereinafter, a second embodiment will be described mainly on differences from the first embodiment, with reference to drawings.

In this embodiment, the resonance current compensation method is changed.

Figure 3:
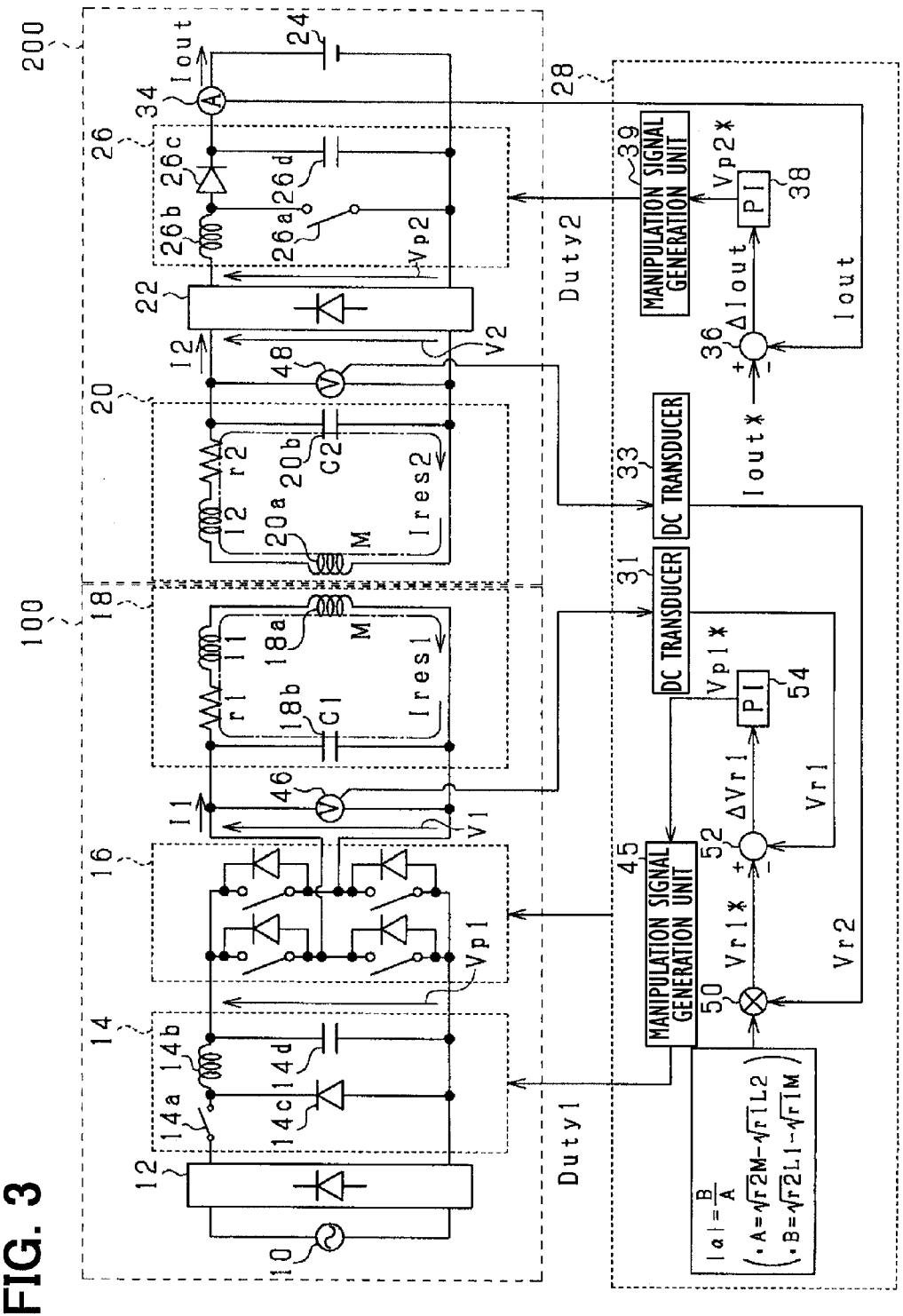
FIG. 3 is a block diagram of a contactless power supply system according to a second embodiment.

FIG. 3 shows the configuration of a contactless power supply system according to this embodiment. In FIG. 3, the same components as in FIG. 1 are denoted by the same reference numerals for convenience.

As shown in FIG. 3, the power transmission system 100 includes a primary side voltage sensor 46 for detecting the input voltage of the primary side resonance circuit 18. Further, the power reception system 200 includes a secondary side voltage sensor 48 for detecting the output voltage of the secondary side resonance circuit 20. The controller 28 captures a detection value of the primary side voltage sensor 46 through the primary side DC transducer 31, and captures a detection value of the secondary side voltage sensor 48 through the secondary side DC transducer 33. In this embodiment, the primary side current sensor 30 and the secondary side current sensor 32 are removed. Further, in this embodiment, the above-mentioned DC transducers 31, 33 have the same configuration as the DC transducers described with FIG. 2 of the first embodiment, and are therefore denoted by the same reference numerals as in the first embodiment.

Next, a resonance current compensation process according to this embodiment will be described.

In this embodiment, the relationship between the primary side resonance current Ires1 and the secondary side resonance current Ires2 through the current coefficient β is expressed by the input voltage V1 of the primary side resonance circuit 18 and the output voltage V2 of the secondary side resonance circuit 20, which will be described below.

By solving the equations (eq1) and (eq2) for the input voltage V1 of the primary side resonance circuit 18 and using the equation (eq6), the following equation (eq7) is derived.

(eq 7)
$$V1 = \left[(j\omega l1 + r1)\sqrt{\frac{r2}{r1}} + j\omega M\left(\sqrt{\frac{r2}{r1}} - 1\right)\right] Ires2 \quad \text{(eq 7)}$$

On the other hand, by solving the equations (eq3) and (eq4) for the secondary side resonance current Ires2 and using the equation (eq6), the following equation (eq8) is derived.

(eq 8)
$$Ires2 = -\frac{1}{\left[(j\omega l2 + r2) + j\omega M\left(1 - \sqrt{\frac{r2}{r1}}\right)\right]} V2 \quad \text{(eq 8)}$$

Further, the following equation (eq9) is derived from the equations (eq7), (eq8).

(eq 9)
$$V1 = \frac{j\omega M(\sqrt{r2} - \sqrt{r1}) + \sqrt{r2}(j\omega l1 + r1)}{j\omega M(\sqrt{r2} - \sqrt{r1}) - \sqrt{r1}(j\omega l2 + r2)} V2 = \alpha V2 \quad \text{(eq 9)}$$

Further, by using a self-inductance L1 (=l1+M) of the primary side coil 18a and a self-inductance L2 (=l2+M) of the secondary side coil 20a, the absolute value of "a" in the equation (eq9) is expressed by the following equation (eq10).

(eq 10)
$$|\alpha| = \left|\frac{r1\sqrt{r2} + j\omega(\sqrt{r2}L1 - \sqrt{r1}M)}{-r2\sqrt{r1} + j\omega(\sqrt{r2}M - \sqrt{r1}L2)}\right| \quad \text{(eq 10)}$$

In the equation (eq10), "|α|" is defined as a voltage coefficient. That is, the voltage coefficient |α| is the absolute value of a transfer function obtained by dividing the input voltage V1 of the primary side resonance circuit 18 by the output voltage V2 of the secondary side resonance circuit 20, on the condition that the primary side resonance current Ires1 equals the product of the secondary side resonance current Ires2 and the current coefficient β.

The equation (eq10) is further expressed as the following equation (eq11).

(eq 11)
$$|\alpha| = \left|\frac{r1\sqrt{r2} + j\omega B}{-r2\sqrt{r1} + j\omega A}\right| \quad \text{(eq 11)}$$

$$= \left|\frac{\sqrt{\{-(r1r2)^{1.5} + \omega^2 AB\}^2 + \omega^2 r1r2(\sqrt{r1}A + \sqrt{r2}B)^2}}{r1r2^2 + \omega^2 A^2}\right|$$

(where $A = \sqrt{r2}M - \sqrt{r1}L2$, $B = \sqrt{r2}L1 - \sqrt{r1}M$)

In this embodiment, the contactless power supply system is configured so that the proportion of the mutual inductance M to the self-inductance L1 of the primary side coil 18a and the self-inductance L2 of the secondary side coil 20a becomes small, so that "A" and "B" are sufficiently smaller than the equivalent series resistances r1, r2 (e.g., A, B=several Ω, whereas r1, r2=several mΩ). With such a configuration, in this embodiment, the relation of "ω×B>>r1" and "ω×A>>r2" holds, and the equation (eq11) can be approximated by the following equation (eq12).

(eq 12)
$$|\alpha| \cong \frac{B}{A} \tag{eq 12}$$

The voltage coefficient $|\alpha|$ expressed by the equation (eq12) includes the mutual inductance M. However, the inventors of the present application have found that in the contactless power supply system in which the equation (eq11) can be approximated by the equation (eq12), a change in the mutual inductance M due to a change in the coupling coefficient between the primary side coil 18a and the secondary side coil 20a has little effect on the voltage coefficient $|\alpha|$. The contactless power supply system in which the equation (eq11) can be approximated by the equation (eq12) can be achieved, for example, by adding a configuration capable of restricting the positional relationship between the primary side coil 18a and the secondary side coil 20a to a power supply station.

Next, the resonance current compensation process using the voltage coefficient $|\alpha|$ will be described.

A primary side command voltage calculation unit 50 multiplies an output value Vr2 of the secondary side DC transducer 33 (the peak value of the output voltage V2 of the secondary side resonance circuit 20 detected by the secondary side voltage sensor 48) by the voltage coefficient $|\alpha|$, thereby calculating a command value (hereinafter referred to as a primary side command voltage Vr1*) of the peak value of the input voltage V1 of the primary side resonance circuit 18.

A primary side voltage deviation calculation unit 52 subtracts an output value Vr1 of the primary side DC transducer 31 (the peak value of the input voltage V1 of the primary side resonance circuit 18 detected by the primary side voltage sensor 46) from the primary side command voltage Vr1*, thereby calculating a primary side voltage deviation ΔVr1.

A primary side feedback manipulation amount calculation unit 54 calculates the command value Vp1* of the output voltage of the primary side converter 14 required to control the output value Vr1 to the primary side command voltage Vr1*, as a manipulation amount for feedback-controlling the output value Vr1 of the primary side DC transducer 31 to the primary side command voltage Vr1*. More specifically, the primary side feedback manipulation amount calculation unit 54 calculates the command value Vp1* of the output voltage by proportional-integral control based on the primary side voltage deviation ΔVr1.

According to the resonance current compensation process described above, the first switching element 14a is turned on and off based on the primary side duty ratio Duty1, so that the output voltage Vp1 of the primary side resonance circuit 18 is manipulated each time. Thereby, the peak value of the input voltage V1 of the primary side resonance circuit 18 is controlled to the primary side command voltage Vr1*.

Thus, in this embodiment, there is performed the resonance current compensation process for manipulating the input voltage of the primary side resonance circuit 18 each time by manipulating the output voltage Vp1 of the primary side converter 14 each time so that the peak value of the input voltage V1 equals the product of the peak value of the output voltage V2 of the secondary side resonance circuit 20 and the voltage coefficient $|\alpha|$. According to this embodiment, the same advantageous effects as in the first embodiment can be obtained.

Third Embodiment

Hereinafter, a third embodiment will be described mainly on differences from the second embodiment, with reference to drawings.

In this embodiment, the voltage coefficient $|\alpha|$ used in the resonance current compensation process is changed.

Figure 4:
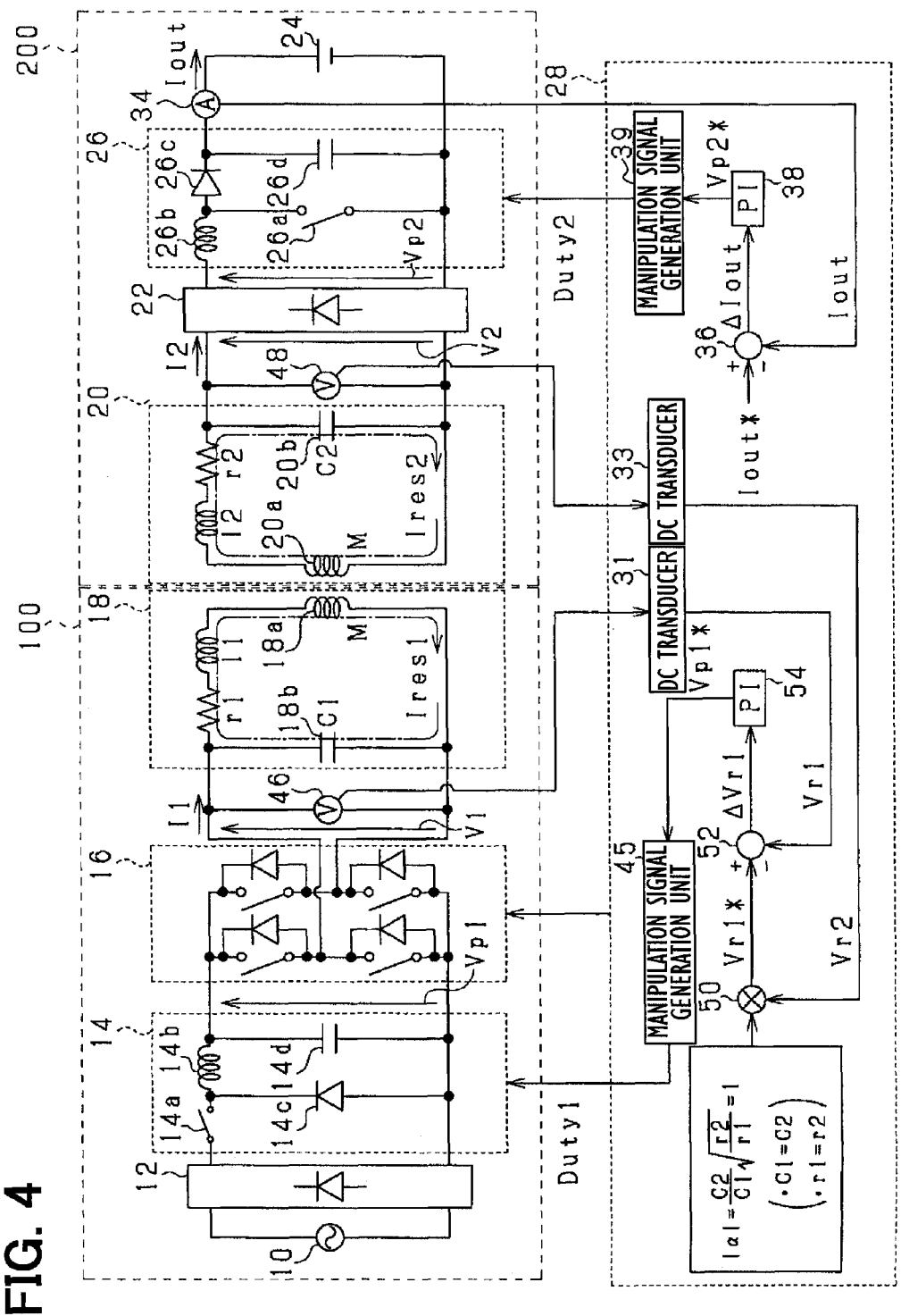
FIG. 4 is a block diagram of a contactless power supply system according to a third embodiment.

FIG. 4 shows the configuration of a contactless power supply system according to this embodiment. In FIG. 4, the same components as in FIG. 3 are denoted by the same reference numerals for convenience.

In this embodiment, the contactless power supply system is configured so that the input current I1 of the primary side resonance circuit 18 is set to be sufficiently smaller than the primary side resonance current Ires1 (I1>>Ires1; for example, I1 is equal to or smaller than 30% of Ires1), and the output current I2 of the secondary side resonance circuit 20 is set to be sufficiently smaller than the secondary side resonance current Ires2 (I2>>Ires2; for example, I2 is equal to or smaller than 30% of Ires2).

By imposing the condition that "I1>>Ires1" and "I2>>Ires2", the equations (eq1), (eq4) can be approximated by the following equations (eq13), (eq14).

(eq 13)
$$V1 = \frac{1}{j\omega C1} Ires1 \tag{eq 13}$$

(eq 14)
$$V2 = \frac{1}{j\omega C2} Ires2 \tag{eq 14}$$

The following equation (eq15) is derived from the equations (eq6), (eq13), (eq14).

(eq 15)
$$V1 = -\frac{C2}{C1}\sqrt{\frac{r2}{r1}} V2 = \alpha V2 \tag{eq 15}$$

The voltage coefficient $|\alpha|$ can be expressed by the following equation (eq16) from the equation (eq15).

(eq 16)
$$|\alpha| = \frac{C2}{C1}\sqrt{\frac{r2}{r1}} \tag{eq 16}$$

Particularly, in this embodiment, the capacitance of the primary side capacitor 18b and the capacitance of the secondary side capacitor 20b are set to be the same value, and the equivalent series resistance of the primary side resonance circuit 18 and the equivalent series resistance of the secondary side resonance circuit 20 are set to be the same value, so that the voltage coefficient |α| equals "1". Accordingly, the input voltage V1 of the primary side resonance circuit 18 equals the output voltage V2 of the secondary side resonance circuit 20.

According to this embodiment described above, the following advantageous effects are obtained in addition to the advantageous effects obtained in the second embodiment.

(3) The contactless power supply system is configured so that the input current I1 of the primary side resonance circuit 18 is set to be sufficiently smaller than the primary side resonance current Ires1, and the output current I2 of the secondary side resonance circuit 20 is set to be sufficiently smaller than the secondary side resonance current Ires2. Accordingly, regardless of the state of the magnetic coupling between the primary side coil 18a and the secondary side coil 20a, the voltage coefficient |α| can be uniquely determined by the capacitance of the primary side capacitor 18b, the capacitance of the secondary side capacitor 20b, the equivalent series resistance r1 of the primary side resonance circuit 18, and the equivalent series resistance r2 of the secondary side resonance circuit 20. Particularly, in this embodiment, the capacitance of the primary side capacitor 18b and the capacitance of the secondary side capacitor 20b are set to be the same value, and the equivalent series resistance of the primary side resonance circuit 18 and the equivalent series resistance of the secondary side resonance circuit 20 are set to be the same value. Accordingly, the setting of the voltage coefficient |α| can be simplified.

Fourth Embodiment

Hereinafter, a fourth embodiment will be described mainly on differences from the third embodiment, with reference to drawings.

In this embodiment, the resonance current compensation method is changed.

Figure 5:
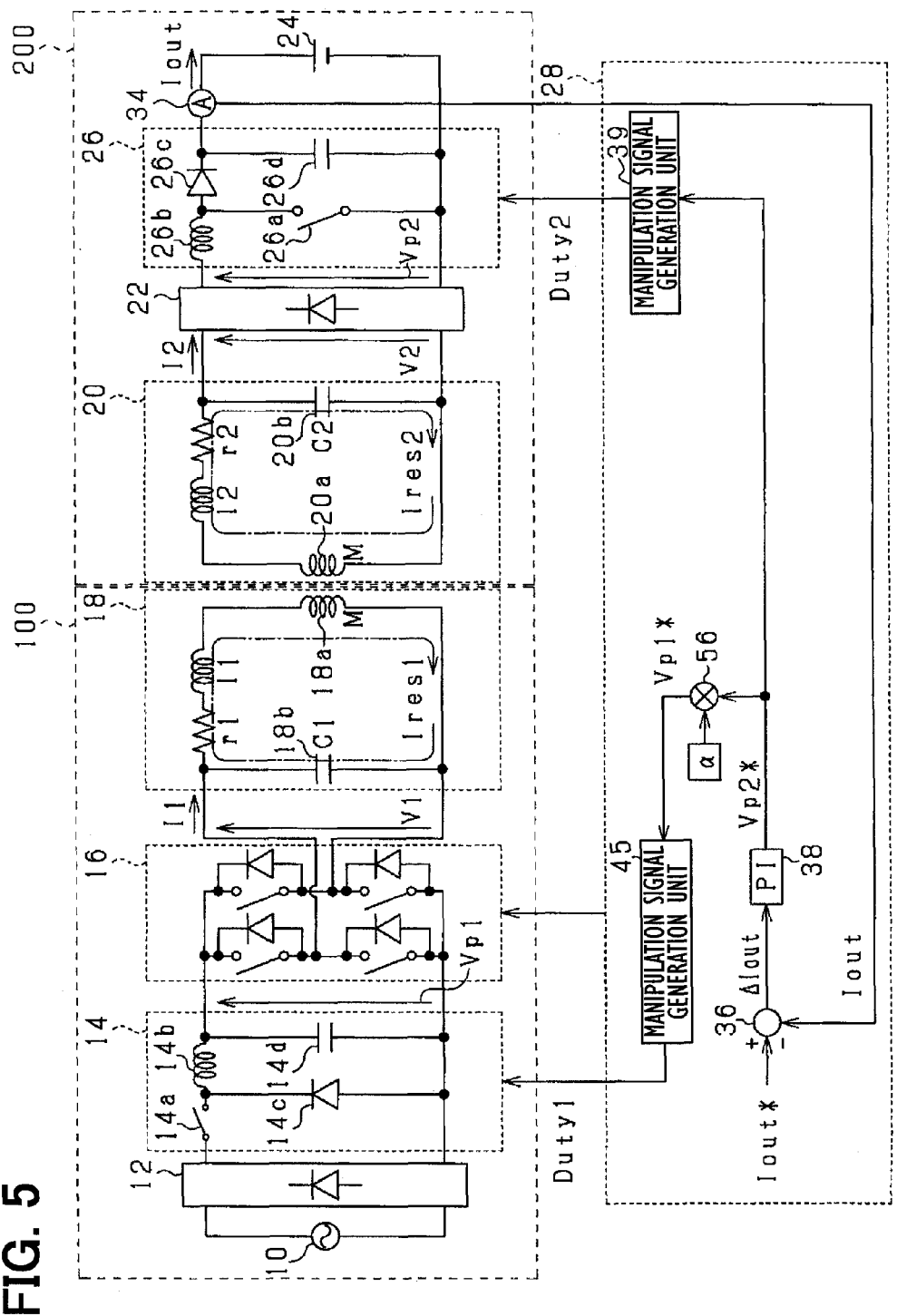
FIG. 5 is a block diagram of a contactless power supply system according to a fourth embodiment.

FIG. 5 shows the configuration of a contactless power supply system according to this embodiment. In FIG. 5, the same components as in FIG. 4 are denoted by the same reference numerals for convenience. In this embodiment, the primary side voltage sensor 46 and the secondary side voltage sensor 48 are removed.

As shown in FIG. 5, the command value Vp2* of the input voltage of the secondary side converter 26 calculated by the secondary side feedback manipulation amount calculation unit 38 is inputted to a primary side feedback manipulation amount calculation unit 56 as well as to the secondary side manipulation signal generation unit 39. The primary side feedback manipulation amount calculation unit 56 multiplies the command value Vp2* of the input voltage by the voltage coefficient |α|, thereby calculating the command value Vp1* of the output voltage of the primary side converter 14.

According to this embodiment described above, the same advantageous effects as in the third embodiment can be obtained.

Fifth Embodiment

Hereinafter, a fifth embodiment will be described mainly on differences from the fourth embodiment, with reference to drawings.

In this embodiment, the resonance current compensation method is changed.

Figure 6:
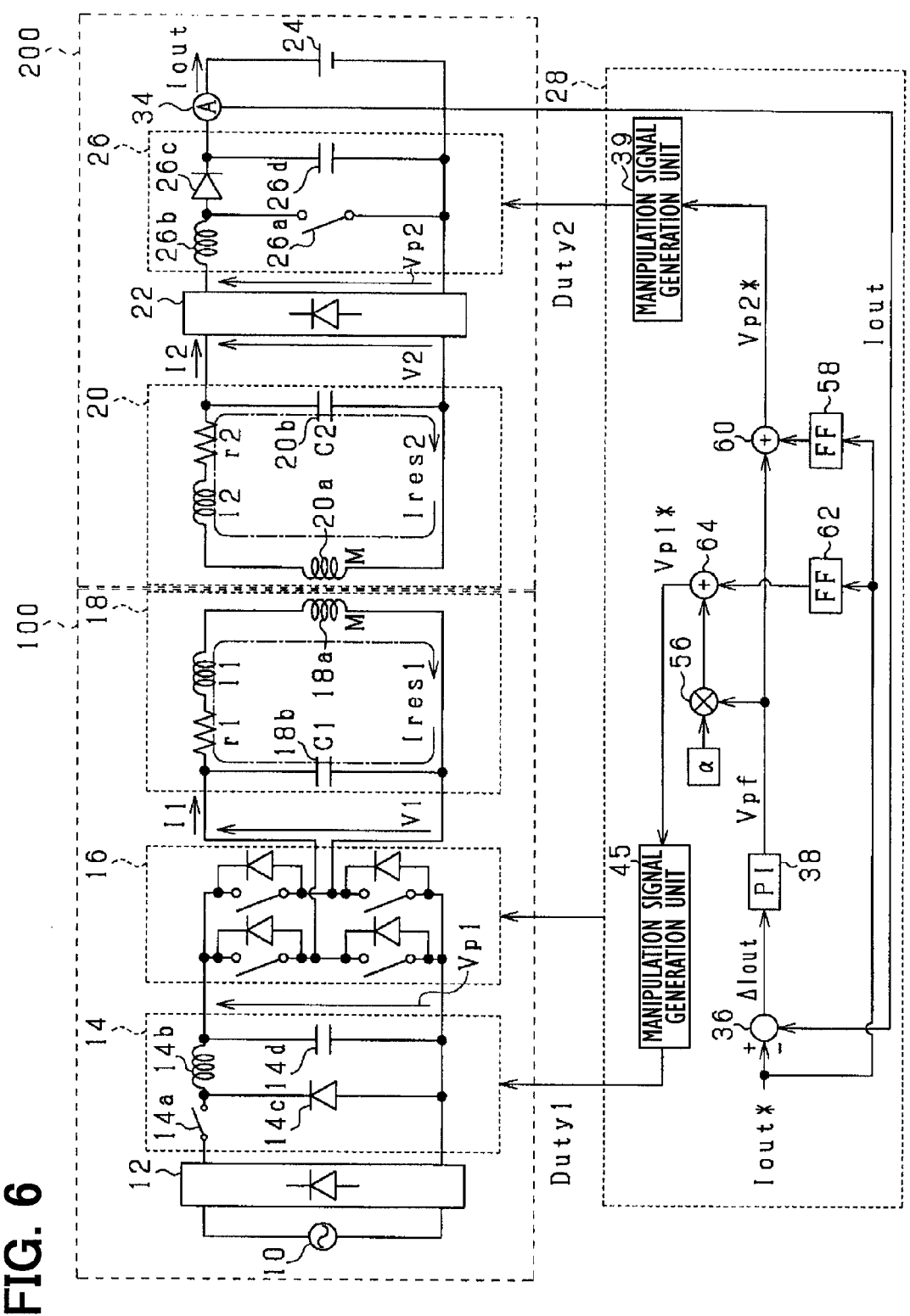
FIG. 6 is a block diagram of a contactless power supply system according to a fifth embodiment.

FIG. 6 shows the configuration of a contactless power supply system according to this embodiment. In FIG. 6, the same components as in FIG. 5 are denoted by the same reference numerals for convenience.

As shown in FIG. 6, in this embodiment, the command value of the input voltage of the secondary side converter 26 calculated by the secondary side feedback manipulation amount calculation unit 38 is represented by "Vpf". The command value Vpf of the input voltage is inputted to a first adder 60. The first adder 60 calculates the final command value Vp2* of the input voltage of the secondary side converter 26 as the sum of the command value Vpf of the input voltage and a feedforward manipulation amount (hereinafter referred to as a secondary side FF manipulation amount) required to control the charging current Iout to the command current Iout*. The secondary side FF manipulation amount is calculated by a secondary side feedforward manipulation amount calculation unit 58 to which the command current Iout* is inputted. The secondary side FF manipulation amount can be calculated, for example, using a map associating the manipulation amount with the command current Iout*. An output value of the first adder 60 is inputted to the secondary side manipulation signal generation unit 39.

On the other hand, the command value Vpf of the input voltage is also inputted to the primary side feedback manipulation amount calculation unit 56. Then, an output value of the primary side feedback manipulation amount calculation unit 56 is inputted to a second adder 64. The second adder 64 calculates the final command value Vp1* of the output voltage of the primary side converter 14 as the sum of the output value of the primary side feedback manipulation amount calculation unit 56 and a feedforward manipulation amount (hereinafter referred to as a primary side FF manipulation amount) required to control the peak value of the primary side resonance current Ires1 to the primary side command current Ir1*. The primary side FF manipulation amount is calculated by a primary side feedforward manipulation amount calculation unit 62 to which the command current Iout* is inputted. The primary side FF manipulation amount can be calculated, for example, using a map associating the manipulation amount with the command current Iout*. The output value of the second adder 62 is inputted to the primary side manipulation signal generation unit 45.

According to this embodiment described above, the same advantageous effects as in the fourth embodiment can be obtained.

Sixth Embodiment

Hereinafter, a sixth embodiment will be described mainly on differences from the second embodiment, with reference to drawings.

In this embodiment, the configuration of the primary side resonance circuit 18 is changed.

Figure 7:
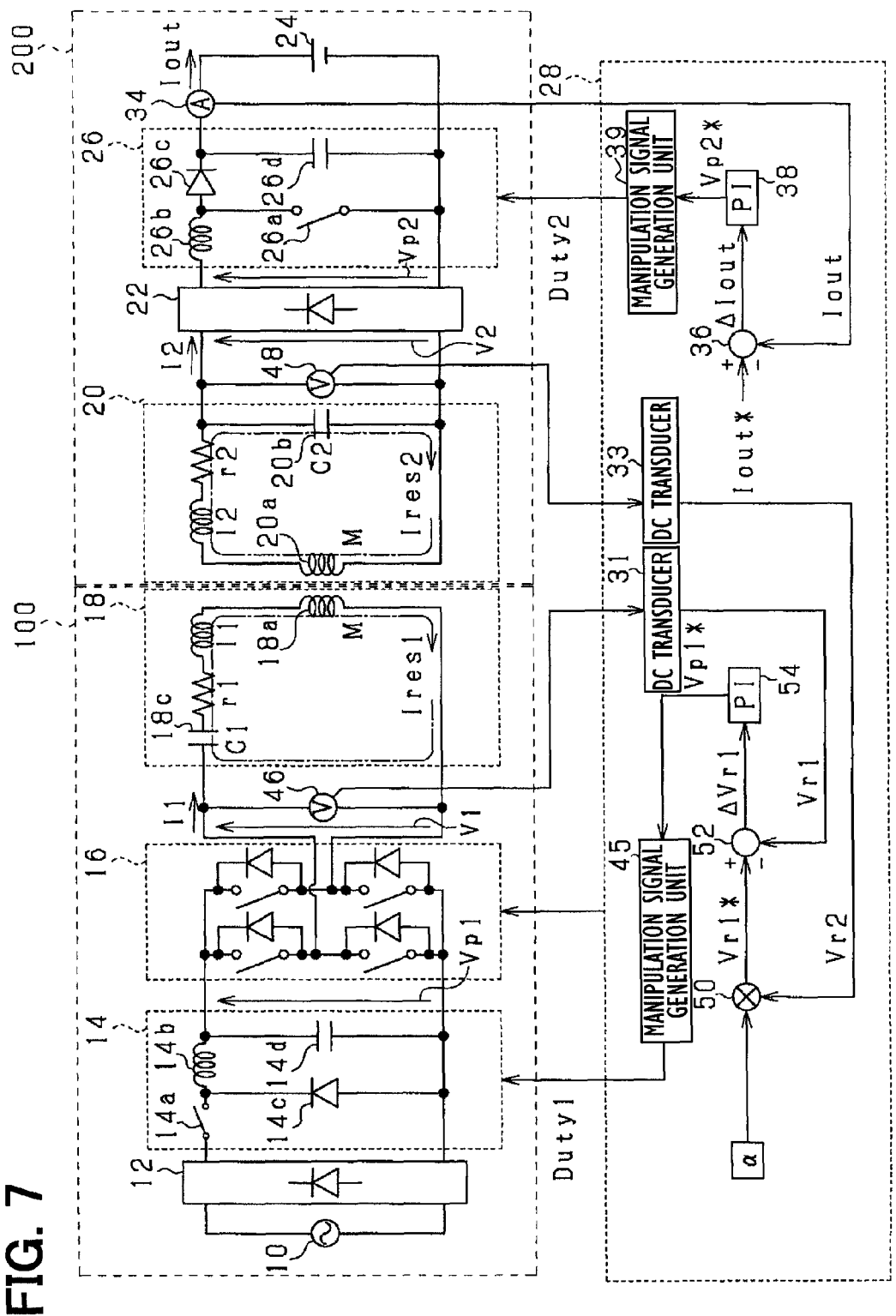
FIG. 7 is a block diagram of a contactless power supply system according to a sixth embodiment.

FIG. 7 shows the configuration of a contactless power supply system according to this embodiment. In FIG. 7, the same components as in FIG. 3 are denoted by the same reference numerals for convenience.

As shown in FIG. 7, in this embodiment, the primary side resonance circuit 18 is an LC series resonance circuit composed of the primary side coil 18a and a primary side capacitor 18c connected in series thereto. In association therewith, the voltage coefficient $|\alpha|$ used by the primary side command voltage calculation unit 50 is changed.

More specifically, by applying Kirchhoff's second law to the respective current paths of the primary side resonance circuit 18, the secondary side resonance circuit 20, and the output side of the secondary side resonance circuit 20, the following equation (eq17) is derived, along with the equations (eq3), (eq4).

(eq 17)
$$V1 = \left(\frac{1}{j\omega C1} + r1 + j\omega l1\right) Ires1 + j\omega M(Ires1 - Ires2) = 0 \quad \text{(eq 17)}$$

The following equation (eq18) is derived from the equations (eq6), (eq17).

(eq 18)
$$V1 = \left[\sqrt{\frac{r2}{r1}}\left(\frac{1}{j\omega C1} + r1 + j\omega l1\right) + j\omega M\left(\sqrt{\frac{r2}{r1}} - 1\right)\right] Ires2 \quad \text{(eq 18)}$$

Further, the following equation (eq19) is derived from the equations (eq18), (eq8).

(eq 19)
$$V1 = \frac{j\omega M(\sqrt{r2} - \sqrt{r1}) + \sqrt{r2}\left(\frac{1}{j\omega C1} + r1 + j\omega l1\right)}{j\omega M(\sqrt{r2} - \sqrt{r1}) - \sqrt{r1}(j\omega l2 + r2)} V2 \quad \text{(eq 19)}$$
$$= \alpha V2$$

The voltage coefficient $|\alpha|$ can be expressed by the following equation (eq20) from the equation (eq19).

(eq 20)
$$|\alpha| = \left|\frac{r1\sqrt{r2} + j\omega\left(B - \frac{\sqrt{r2}}{\omega^2 C1}\right)}{-r2\sqrt{r1} + j\omega A}\right| \quad \text{(eq 20)}$$
$$= \left|\frac{\sqrt{\{-(r1r2)^{1.5} + \omega^2 AB\}^2 + \omega^2 r1r2\left\{\sqrt{r1}\,A + \sqrt{r2}\left(B - \frac{\sqrt{r2}}{\omega^2 C1}\right)\right\}^2}}{r1r2^2 + \omega^2 A^2}\right|$$

In this embodiment as well, by using the same method as the approximation of the equation (eq11) to the equation (eq12), the equation (eq20) can be approximated by the following equation (eq21).

(eq 21)
$$|\alpha| = \frac{\left(B - \frac{\sqrt{r2}}{\omega^2 C1}\right)}{A} \quad \text{(eq 21)}$$

According to this embodiment described above, the same advantageous effects as in the second embodiment can be obtained.

Other Embodiments

The above embodiments may be changed and implemented as follows.

In the second embodiment, the resonance current compensation process may be performed using the voltage coefficient $|\alpha|$ expressed by the equation (eq11). In this case as well, it is possible to enhance the power transmission efficiency between the primary side coil 18*a* and the secondary side coil 20*a*.

In the third embodiment, either the capacitances C1, C2 of the primary side capacitor 18*b* and the secondary side capacitor 20*b* or the equivalent series resistances r1, r2 of the primary side resonance circuit 18 and the secondary side resonance circuit 20 may be set to the same value. In this case as well, it is possible to uniquely determine the voltage coefficient $|\alpha|$ by either the capacitances or the equivalent series resistances. Alternatively, the capacitance C1 of the primary side capacitor 18*b* and the capacitance C2 of the secondary side capacitor 20*b* may be set to different values, and the equivalent series resistance r1 of the primary side resonance circuit 18 and the equivalent series resistance r2 of the secondary side resonance circuit 20 may be set to different values. In this case as well, it is possible to uniquely determine the voltage coefficient $|\alpha|$ by the capacitances C1, C2 and the equivalent series resistances r1, r2, as expressed by the equation (eq16).

The combination of "the primary side resonance circuit" and "the secondary side resonance circuit" is not limited to illustrations in the above embodiments. For example, both the primary side resonance circuit and the secondary side resonance circuit may be LC series resonance circuits, or the primary side resonance circuit may be an LC parallel resonance circuit and the secondary side resonance circuit may be an LC series resonance circuit.

The "manipulation unit (manipulation means)" for manipulating the secondary side converter 26 to control the power outputted to the battery 24 to the command value is not limited to the unit for manipulating the secondary side converter 26 to control the current outputted to the battery 24 to the command current Iout*. For example, in the first embodiment, a unit for performing constant voltage control for manipulating the secondary side converter 26 to control the voltage outputted to the battery 24 to a command voltage may be adopted.

In the sixth embodiment, the resonance current compensation process using the current coefficient β described in the first embodiment may be performed.

The "load" is not limited to the battery 24, and may be other in-vehicle electrical equipment.

The DC transducer is not limited to the peak value detection circuit for outputting the peak value of the input AC signal, and may be, for example, an effective value detection circuit for outputting the effective value of the input AC signal. In this case, for example in the first embodiment, the resonance current compensation process is performed using the respective effective values of the primary side resonance current Ires1 and the secondary side resonance current Ires2.

While the embodiments and modifications of the present disclosure have been illustrated, embodiments and modifications of the present disclosure are not limited to the respective embodiments and modifications illustrated above.

For example, embodiments and modifications obtained by appropriately combining technical elements disclosed in the different embodiments and modifications are included in the scope of embodiments and modifications of the present disclosure.

The invention claimed is:

1. A contactless power supply controller applied to a contactless power supply system that transfers power without contact between a primary side coil and a secondary side coil, wherein
the primary side coil and a primary side capacitor constitute a primary side resonance circuit and
the secondary side coil and a secondary side capacitor constitute a secondary side resonance circuit,
the contactless power supply system including:
an AC voltage application unit that applies an AC voltage to the primary side resonance circuit;
a secondary side rectifier circuit that converts an AC voltage outputted from the secondary side resonance circuit into a DC voltage; and
a secondary side converter that converts the DC voltage outputted from the secondary side rectifier circuit into a predetermined DC voltage and outputs the predetermined DC voltage to a load,
the contactless power supply controller comprising:
a manipulation unit that
manipulates the secondary side converter so that power outputted to the load is controlled to be a command value and
manipulates an input voltage of the primary side resonance circuit so that a current flowing in the primary side resonance circuit equals a product of a current flowing in the secondary side resonance circuit and a current coefficient, wherein the current coefficient is defined as a square root of a specific value and the specific value is an equivalent resistance of the secondary side resonance circuit divided by an equivalent resistance of the primary side resonance circuit.

2. The contactless power supply controller according to claim 1, wherein
an absolute value of a transfer function obtained by dividing the input voltage of the primary side resonance circuit by an output voltage of the secondary side resonance circuit on condition that the current flowing in the primary side resonance circuit equals the product of the current flowing in the secondary side resonance circuit and the current coefficient is defined as a voltage coefficient, and
the manipulation unit manipulates the input voltage of the primary side resonance circuit so that the input voltage of the primary side resonance circuit equals a product of the output voltage of the secondary side resonance circuit and the voltage coefficient.

3. The contactless power supply controller according to claim 2, wherein
the primary side resonance circuit includes an LC parallel resonance circuit in which the primary side capacitor is connected in parallel to the primary side coil,
the secondary side resonance circuit includes an LC parallel resonance circuit in which the secondary side capacitor is connected in parallel to the secondary side coil, and
the contactless power supply system is configured so that an input current of the primary side resonance circuit is set to be smaller than the current flowing in the primary side resonance circuit and an output current of the secondary side resonance circuit is set to be smaller than the current flowing in the secondary side resonance circuit.

4. The contactless power supply controller according to claim 3, wherein
at least one of the following is satisfied:
capacitances of the primary side capacitor and the secondary side capacitor are set to a same value; and
the equivalent resistances of the primary side resonance circuit and the secondary side resonance circuit are set to a same value.

5. The contactless power supply controller according to claim 1, wherein
the primary side resonance circuit includes an LC series resonance circuit in which the primary side capacitor is connected in series to the primary side coil, and
the secondary side resonance circuit includes an LC parallel resonance circuit in which the secondary side capacitor is connected in parallel to the secondary side coil.

6. The contactless power supply controller according to claim 1, wherein
the contactless power supply system includes a step-down converter that steps down a DC voltage inputted from a DC power source and outputs a stepped-down voltage to the AC voltage application unit,
the secondary side converter is a step-up converter that steps up the DC voltage outputted from the secondary side rectifier circuit and outputs a stepped-up voltage to the load, and
the manipulation unit manipulates the input voltage of the primary side resonance circuit by manipulating an output voltage of the step-down converter so that the current flowing in the primary side resonance circuit equals the product of the current flowing in the secondary side resonance circuit and the current coefficient.

7. A contactless power supply system that transfers power without contact between a primary side coil and a secondary side coil, the contactless power supply system comprising:
a primary side resonance circuit including the primary side coil and a primary side capacitor;
a secondary side resonance circuit including the secondary side coil and a secondary side capacitor;
an AC voltage application unit that applies an AC voltage to the primary side resonance circuit;
a secondary side rectifier circuit that converts an AC voltage outputted from the secondary side resonance circuit into a DC voltage;
a secondary side converter that converts the DC voltage outputted from the secondary side rectifier circuit into a predetermined DC voltage and outputs the predetermined DC voltage to a load; and
a manipulation unit that
manipulates the secondary side converter so that power outputted to the load is controlled to be a command value and
manipulates an input voltage of the primary side resonance circuit so that a current flowing in the primary side resonance circuit equals a product of a current flowing in the secondary side resonance circuit and a current coefficient, wherein the current coefficient is defined as a square root of a specific value and the specific value is an equivalent resistance of the secondary side resonance circuit divided by an equivalent resistance of the primary side resonance circuit.

8. The contactless power supply system according to claim 7, wherein
- an absolute value of a transfer function obtained by dividing the input voltage of the primary side resonance circuit by an output voltage of the secondary side resonance circuit on condition that the current flowing in the primary side resonance circuit equals the product of the current flowing in the secondary side resonance circuit and the current coefficient is defined as a voltage coefficient, and
- the manipulation unit manipulates the input voltage of the primary side resonance circuit so that the input voltage of the primary side resonance circuit equals a product of the output voltage of the secondary side resonance circuit and the voltage coefficient.

9. The contactless power supply system according to claim 8, wherein the primary side resonance circuit includes an LC parallel resonance circuit in which the primary side capacitor is connected in parallel to the primary side coil,
- the secondary side resonance circuit includes an LC parallel resonance circuit in which the secondary side capacitor is connected in parallel to the secondary side coil, and
- the contactless power supply system is configured so that an input current of the primary side resonance circuit is set to be smaller than the current flowing in the primary side resonance circuit and an output current of the secondary side resonance circuit is set to be smaller than the current flowing in the secondary side resonance circuit.

10. The contactless power supply system according to claim 9, wherein at least one of the followings is satisfied:
- capacitances of the primary side capacitor and the secondary side capacitor are set to a same value; and
- the equivalent resistances of the primary side resonance circuit and the secondary side resonance circuit are set to a same value.

11. The contactless power supply system according to claim 7, wherein
- the primary side resonance circuit includes an LC series resonance circuit in which the primary side capacitor is connected in series to the primary side coil, and
- the secondary side resonance circuit includes an LC parallel resonance circuit in which the secondary side capacitor is connected in parallel to the secondary side coil.

12. The contactless power supply system according to claim 7, further comprising
- a step-down converter that steps down a DC voltage inputted from a DC power source and outputs a stepped-down voltage to the AC voltage application unit, wherein
- the secondary side converter is a step-up converter that steps up the DC voltage outputted from the secondary side rectifier circuit and outputs a stepped-up voltage to the load, and
- the manipulation unit manipulates the input voltage of the primary side resonance circuit by manipulating an output voltage of the step-down converter so that the current flowing in the primary side resonance circuit equals the product of the current flowing in the secondary side resonance circuit and the current coefficient.

* * * * *